(12) United States Patent
Lee et al.

(10) Patent No.: US 8,537,108 B2
(45) Date of Patent: Sep. 17, 2013

(54) NAVIGATION TOOL WITH AUDIBLE FEEDBACK ON A HANDHELD COMMUNICATION DEVICE HAVING A FULL ALPHABETIC KEYBOARD

(75) Inventors: Matthew Richard Lee, Belleville (CA);
Andrew D. Bocking, Conestogo (CA);
David Mak-Fan, Waterloo (CA); Steven Henry Fyke, Waterloo (CA); Matthew Bells, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 510 days.

(21) Appl. No.: 12/577,076

(22) Filed: Oct. 9, 2009

(65) Prior Publication Data

US 2010/0259369 A1 Oct. 14, 2010

Related U.S. Application Data

(62) Division of application No. 11/422,538, filed on Jun. 6, 2006, now Pat. No. 7,770,118.

(60) Provisional application No. 60/773,145, filed on Feb. 13, 2006, provisional application No. 60/773,799, filed on Feb. 14, 2006.

(51) Int. Cl.
*G06F 3/033* (2013.01)

(52) U.S. Cl.
USPC .......................................... 345/157; 715/786

(58) Field of Classification Search
USPC .................................. 345/173, 167; 715/786
See application file for complete search history.

(56) References Cited

U.S. PATENT DOCUMENTS

| | | | |
|---|---|---|---|
| 5,374,924 A | 12/1994 | McKiel, Jr. | |
| 5,461,399 A | 10/1995 | Cragun | |
| 5,801,692 A | 9/1998 | Muzio et al. | |
| 5,867,914 A | 2/1999 | Watson et al. | |
| 6,404,442 B1 | 6/2002 | Hilpert, Jr. et al. | |
| 6,429,851 B1 | 8/2002 | Vaghefi et al. | |
| 6,469,712 B1 | 10/2002 | Hilpert, Jr. et al. | |
| 6,532,005 B1 * | 3/2003 | Campbell | 345/173 |
| 6,532,152 B1 | 3/2003 | White | |
| 6,912,500 B2 | 6/2005 | Hickey et al. | |
| 6,996,777 B2 | 2/2006 | Hiipakka | |
| 7,036,087 B1 | 4/2006 | Odom | |
| 2001/0047384 A1 * | 11/2001 | Croy | 709/203 |
| 2003/0231164 A1 | 12/2003 | Blumer, Jr. et al. | |
| 2004/0017355 A1 | 1/2004 | Shim | |

(Continued)

OTHER PUBLICATIONS

Non-Final Rejection for U.S. Appl. No. 11/422,525 dated Aug. 4, 2008.

(Continued)

*Primary Examiner* — Mark Hellner
(74) *Attorney, Agent, or Firm* — Jose Gutman; Fleit Gibbons Gutman Bongini & Bianco PL

(57) ABSTRACT

System and method that provides tactical feedback through a speaker of a handheld electronic device having a full alphabetic keyboard upon activation of a navigation tool. The audible feedback produced by the speaker is capable of being modified based on upon the location, speed, and other characteristics of the movement of a cursor on the display of a handheld electronic device. The sound produced by the speaker can originate from an audio file stored or otherwise available on the handheld electronic device.

14 Claims, 10 Drawing Sheets

(56) References Cited

U.S. PATENT DOCUMENTS

| | | | |
|---|---|---|---|
| 2004/0164963 A1* | 8/2004 | Ono et al. | 345/167 |
| 2005/0093817 A1 | 5/2005 | Pagan | |
| 2005/0125570 A1* | 6/2005 | Olodort et al. | 710/15 |
| 2006/0095864 A1 | 5/2006 | Mock et al. | |
| 2006/0187202 A1 | 8/2006 | Fyke et al. | |
| 2007/0083822 A1* | 4/2007 | Robbin et al. | 715/786 |
| 2007/0120834 A1* | 5/2007 | Boillot | 345/173 |
| 2007/0188458 A1 | 8/2007 | Bells et al. | |
| 2007/0188459 A1 | 8/2007 | Bells et al. | |
| 2007/0188460 A1 | 8/2007 | Bells et al. | |
| 2007/0188461 A1 | 8/2007 | Bells et al. | |
| 2007/0192026 A1 | 8/2007 | Lee et al. | |
| 2007/0192027 A1 | 8/2007 | Lee et al. | |
| 2007/0192028 A1 | 8/2007 | Lee et al. | |
| 2007/0192699 A1 | 8/2007 | Lee et al. | |
| 2008/0072154 A1 | 3/2008 | Michaelis et al. | |

OTHER PUBLICATIONS

Final Rejection for U.S. Appl. No. 11/422,525 dated Feb. 5, 2009.
Non-Final Rejection for U.S. Appl. No. 11/422,525 dated Jul. 10, 2009.
Final Rejection for U.S. Appl. No. 11/422,525 dated Dec. 28, 2009.
Non-Final Rejection for U.S. Appl. No. 11/422,525 dated Jun. 23, 2010.
Final Rejection for U.S. Appl. No. 11/422,525 dated Dec. 9, 2010.
Non-Final Rejection for U.S. Appl. No. 11/422,525 dated May 12, 2011.

* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | |
| Z | X | C | V | B | N | M | | | |

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | |
| Y | X | C | V | B | N | M | | | |

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | |
| W | X | C | V | B | N | M | | | |

NAVIGATION TOOL WITH AUDIBLE FEEDBACK ON A HANDHELD COMMUNICATION DEVICE HAVING A FULL ALPHABETIC KEYBOARD

CROSS-REFERENCE TO RELATED APPLICATIONS

The present application is a divisional of U.S. patent application Ser. No. 11/422,538, filed Jun. 6, 2006, which application claims the benefit of U.S. Provisional Patent App. Nos. 60/773,145, filed Feb. 13, 2006, and 60/773,799, filed Feb. 14, 2006. Application Ser. Nos. 11/422,538, 60/773,145, and 60/773,799 are incorporated herein by reference in their entirety.

FIELD

This disclosure relates to a system and method for providing audible feedback from a speaker when a navigation tool is actuated on a wireless handheld electronic communication device.

BACKGROUND

With the advent of more robust wireless communications systems, compatible handheld communication devices are becoming more prevalent, as well as advanced. Where in the past such handheld devices typically accommodated either voice (cell phones) or text transmission (pagers and PDAs), today's consumer often demands a combination device capable of performing both types of transmissions, including sending and receiving e-mail. The suppliers of such mobile communication devices and underlying service providers are anxious to meet these demands, but the combination of voice and textual messaging, as well as other functionalities such as those found in PDAs, have caused designers to have to improve the means by which information is input into the devices by the user, as well as provide better facilitation for the user to navigate within the menus and icon presentations necessary for efficient user interface with these more complicated devices.

For many reasons, screen icons are often utilized in such handheld communication devices as a way to allow users to make feature and/or function selections. Among other reasons, users are accustomed to such icon representations for function selection. A prime example is the personal computer "desktop" presented by Microsoft's Windows® operating system. Because of the penetration of such programs into the user markets, most electronics users are familiar with what has basically become a convention of icon-based functionality selections. Even with many icons presented on a personal computer's "desktop", however, user navigation and selection among the different icons is easily accomplished utilizing a conventional mouse and employing the point-and-click methodology. The absence of such a mouse from these handheld wireless communication devices, however, has necessitated that mouse substitutes be developed for navigational purposes. Mouse-type functionalities are needed for navigating and selecting screen icons, for navigating and selecting menu choices in "drop down" type menus and also for just moving a "pointer" type cursor across the display screen.

Today, such mouse substitutes take the form of rotatable thumb wheels, joysticks, touchpads, four-way cursors and the like. In the present description, a trackball is also disclosed as a screen navigational tool. It is known to provide navigation tools such as the rotatable thumb wheel with a ratchet-feeling affect that provides the user tactile feedback when rotating the navigation tool. This feedback provides the user with additional sensory information besides the induced visible motion on the display screen. In typical trackball assemblies, the trackball freely rotates within a receiving socket. Because of the many different directions within which freedom of movement is possible, it is much more difficult to affect a similar ratchet-feeling as provided in the thumb wheel which rotates about a fixed axis. The benefits of such ratchet type, incremental feed back is, however, still desired for trackball implementations whether it be of a tactile nature, or otherwise.

In one such available but not optimal implementation, the handheld electronic device makes use of a navigation tool in combination with a piezoelectric buzzer that provides audible user feedback. The piezoelectric buzzer does provide audible feedback upon actuation of the navigation tool, but it is limited in the types and variety of sounds it is capable of outputting.

Therefore, a need has been recognized for a navigation tool in a handheld electronic device that provides audible feedback to the user regarding the user's request for movement of a cursor on a display screen of the electronic device, via the navigation tool.

BRIEF DESCRIPTION OF THE DRAWINGS

Exemplary methods and arrangements conducted and configured according to the advantageous solutions presented herein are depicted in the accompanying drawings where in:

FIG. 5 illustrates an exemplary QWERTY keyboard layout;

FIG. 6 illustrates an exemplary QWERTZ keyboard layout;

FIG. 7 illustrates an exemplary AZERTY keyboard layout;

FIG. 8 illustrates an exemplary Dvorak keyboard layout;

FIG. 9 illustrates a QWERTY keyboard layout paired with a traditional ten-key keyboard;

FIG. 10 illustrates ten digits comprising the numerals 0-9 arranged as on a telephone keypad, including the * and # astride the zero;

FIG. 11 illustrates a numeric phone key arrangement according to the ITU Standard E.161 including both numerals and letters;

DETAILED DESCRIPTION

Figure 1:
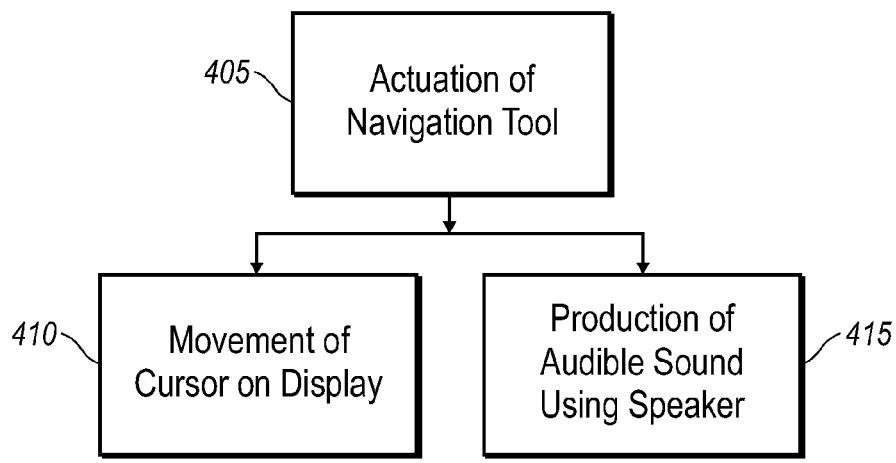
FIG. 1 is flow chart illustrating an exemplary method for producing a sound in response to actuation of a navigation tool.
Figure 3:
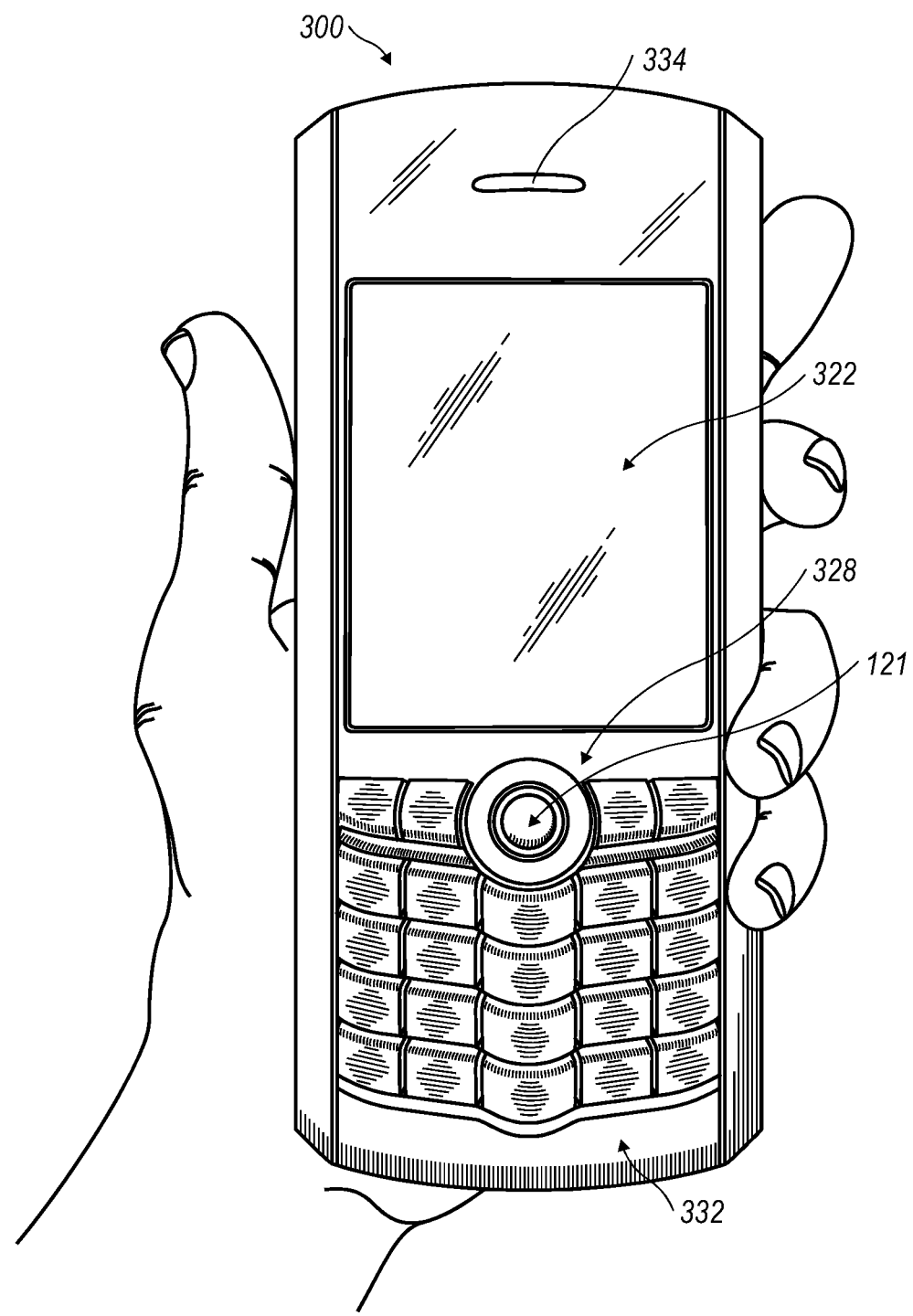
FIG. 3 is a perspective view of a handheld electronic device cradled in a user's hand.
Figure 4:
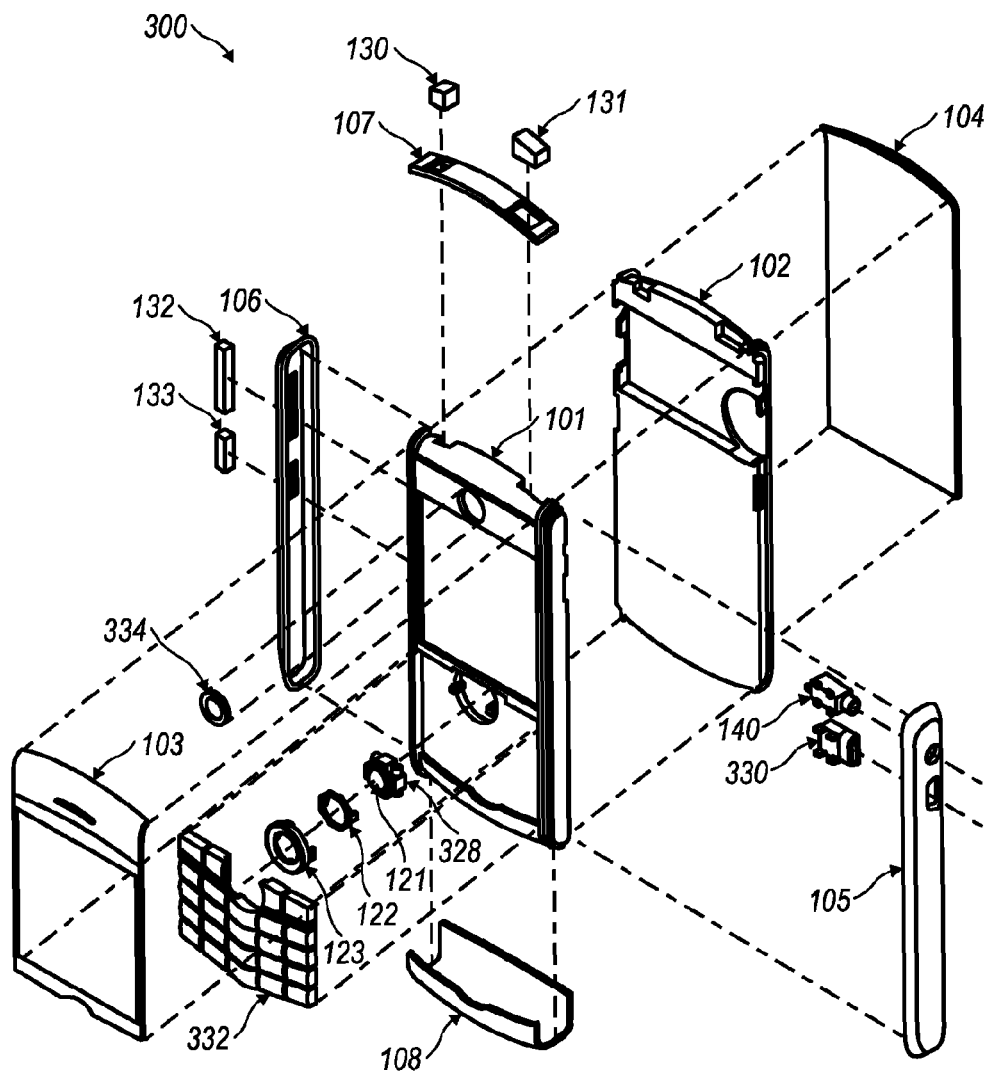
FIG. 4 is an exploded perspective view of an exemplary wireless handheld electronic device incorporating a trackball assembly as the auxiliary input which also serves as the navigational tool.

This disclosure describes methods and arrangements for producing a sound when the navigation tool 328 (as shown in FIG. 3) of a handheld electronic device 300 is actuated. FIG. 1 presents a flow chart of a method in which an audible sound 415 is produced along with cursor movement 410 on a display screen 322 of the device 300 through user actuation of the navigation tool. The sound production utilizes a speaker 334 (as shown in FIG. 4). In a preferred embodiment, the sound produced by the speaker 334 is dependent upon the direction of the requested motion by the navigation tool.

As used herein, the term handheld electronic device 300 describes a relatively small device that is capable of being held in a user's hand. It is a broader term that includes devices that are further classified as handheld communication devices 300 that interact with communication networks 319.

Figure 18:
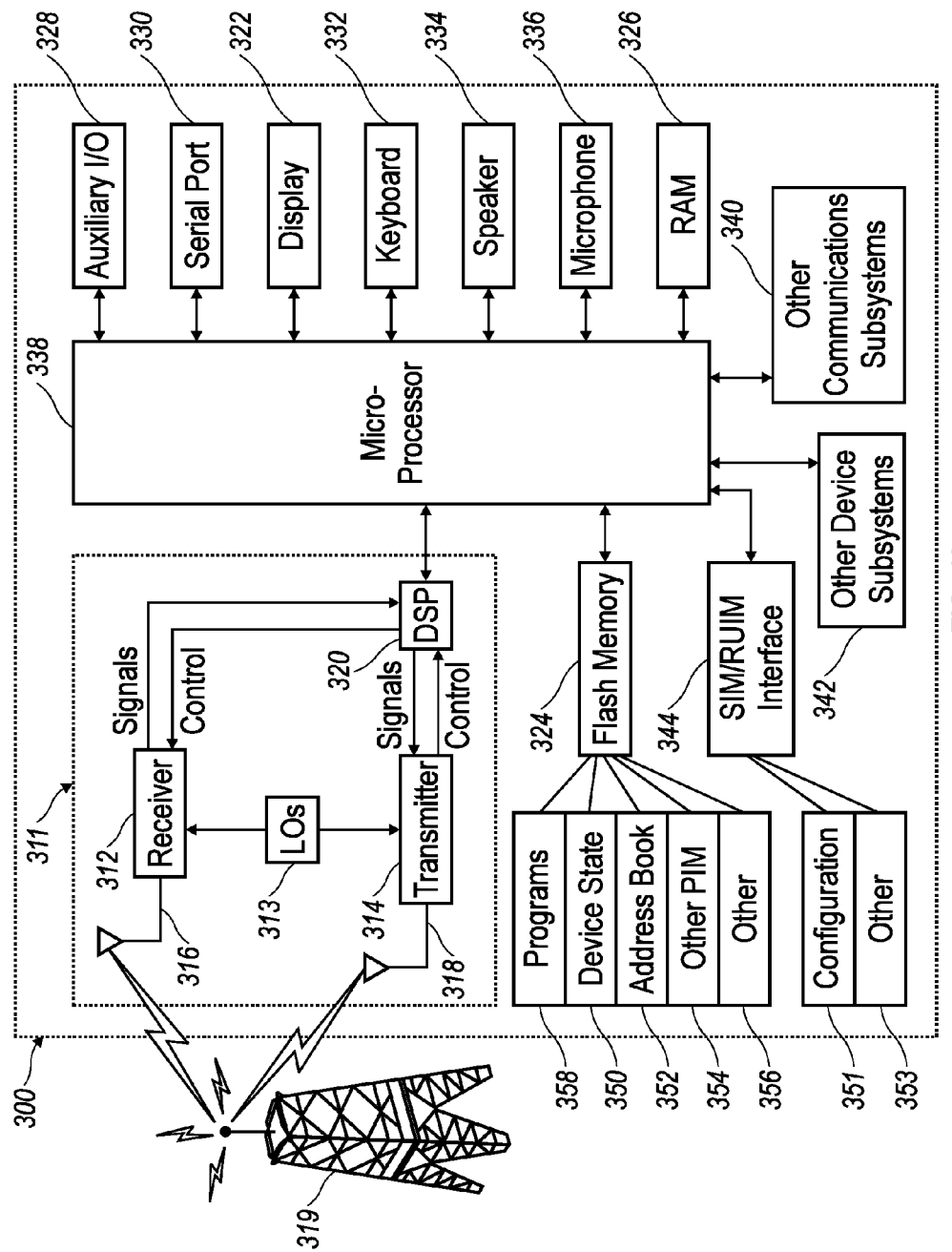
FIG. 18 is a block diagram representing a wireless handheld communication device interacting in a communication network.

When cooperating in a communications network 319 as depicted in FIG. 18, the handheld communication device 300 wirelessly transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for producing audible sound is equally applicable to single mode devices; i.e. voice-only devices and text-only devices.

As may be appreciated from FIG. 3, the handheld electronic device 300 comprises a lighted display 322 located above a keyboard 332 suitable for accommodating textual input to the handheld electronic device 300 when in an operable configuration. As shown, the device 300 is of unibody construction, but it is also contemplated that the device may be of an alternative construction such as that commonly known as "clamshell" or "flip-phone" style. Regardless, in the operable configuration for the device 300, the navigation tool (auxiliary input) 328 is located essentially between the display 322 and the keyboard 332.

Figure 12:
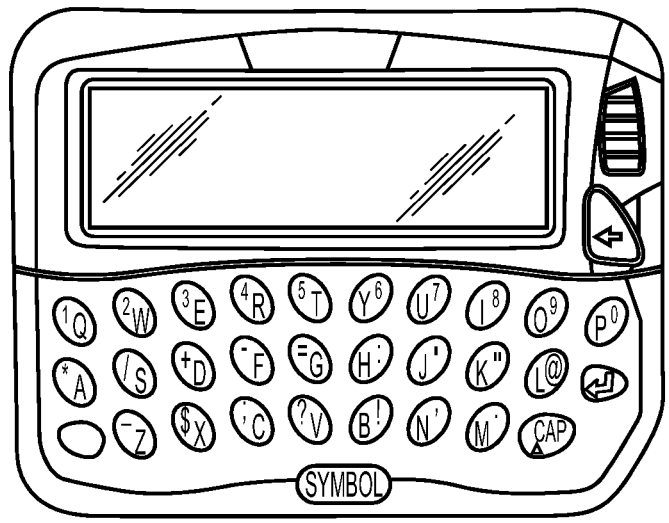
FIG. 12 is a front view of an exemplary handheld electronic device including a full QWERTY keyboard.
Figure 13:
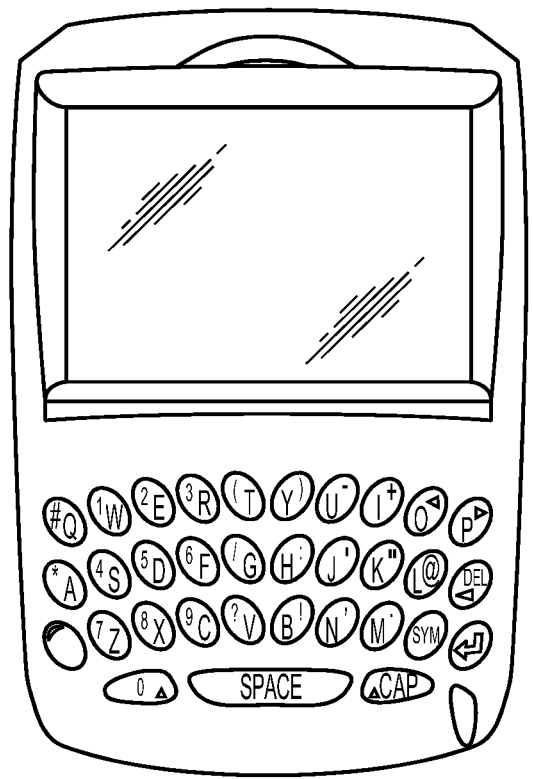
FIG. 13 is a front view of another exemplary handheld electronic device including a full QWERTY keyboard.

In one embodiment, the keyboard 332 comprises a plurality of keys with which alphabetic letters are associated on a one letter per key basis. It is contemplated that the keys may be directly marked with letters, or the letters may be presented adjacent, but clearly in association with a particular key. This one-to-one pairing between the letters and keys is depicted in FIGS. 12 and 13 and is described in greater detail below in association therewith. In order to facilitate user input, the alphabetic letters are preferably configured in a familiar QWERTY, QWERTZ, AZERTY, or Dvorak layout, each of which is also discussed in greater detail hereinbelow.

In an alternative configuration, the keyboard 332 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others come in QWERTY (see FIGS. 14-17 as examples), QWERTZ, AZERTY, and Dvorak layouts.

In one embodiment, the present method produces an audible sound that emanates from speaker 334 of the handheld electronic device 300 that includes an operating system with associated applications capable of detecting movement of the navigation tool 328 of the handheld device 300 and generating audible sound from the speaker 334 in response to the detected movement of the navigation tool 328.

Another embodiment takes the form of a method for producing 415 audible user feedback from the speaker 334 of a handheld electronic device 300 that includes sensing motion 405 of a navigation tool 328 and providing a signal to the speaker 334 to produce 415 a desired sound corresponding to the motion of the navigation tool 328.

A still further embodiment takes the form of a method for producing 415 audible user feedback from the speaker 334 of a handheld electronic device 300 that includes employing a navigation tool 328 to direct motion of a cursor on a display screen 322 of the handheld electronic device 300. At substantially the same time, sound signals are sent to the speaker 334 of the handheld device 300 that are based upon sensed movement of the navigation tool 328. Responsively, a corresponding sound is produced 415 from the speaker 334 that provides audible feedback to the user that correlates to movement of the navigation tool 328 and movement 410 of the display cursor.

In yet another embodiment, an audible feedback system for a handheld electronic device 300 includes a speaker 334 physically connected to the handheld electronic device 300, a navigation tool 328 for directing motion of a cursor on a display 322 of the handheld electronic device 300, and a program capable of controlling signals to be sent to the speaker 334. The program produces different signals in response to the movement of the cursor.

Audible feedback while using a navigation tool 328 provides a user with an additional sensory indication. This audible feedback is through the use of sound in relation to the motion of the navigation tool 328. The motion of the navigation tool 328 commands a cursor to move on the display screen 322 of a handheld electronic device 300. While "cursor" movement is referred to herein, it shall be appreciated that any resultant motion that is directed by the navigation tool 328 is contemplated. Other such motions include but are not limited to scrolling down through a view on a webpage and scrolling through menu options. It should be appreciated that all such types of navigational motion on the display screen 322 is exemplarily described herein in terms of a cursor's (such as a pointing arrow) movement across a display screen 322; however, those persons skilled in the art will also appreciate that "cursor" movement or navigation on a screen can also be descriptive of successively highlighting presented menu items, screen icons and the like.

The audible sound 415 that is linked with the motion 410 of navigation tool 328 originates from the speaker 334 incorporated within the handheld device 300. In a preferred embodiment, the handheld electronic device 300 makes use of a single speaker 334. This speaker 334 can be part of the sound system of the handheld electronic device 300. For example, if the handheld electronic device 300 is a wireless communication device 300 having voice capabilities, the speaker 334 is the same speaker 334 used to provide a ringer, speaker phone, and the audible sounds of voice communication. In other embodiments, the speaker 334 is in addition to, and separate from at least one of the ringer, speaker phone or audible communication speakers of the handheld electronic device 300.

In the preferred embodiment, the speaker 334 over which audible user feedback is communicated is a speaker 334 that the handheld electronic device 300 would be equipped with regardless of the use of such audible feedback. This embodiment advantageously requires no additional components, yet it provides suitable audible feedback 415 indicative of user actuation of the navigation tool 405. As compared to a piezoelectric buzzer, this implementation saves both space on the board and overall construction of the device 300. Furthermore, by using the speaker 334 on the device 300, a power savings is also realized as compared to using a piezoelectric buzzer to produce the same sound. While the production of a single sound might not result in a large change of the power consumption, the repeated sound production used for audible feedback over the speaker 334 during a typical day could be significant if not economized.

Additionally, the types of sounds that are capable of being produced over a speaker 334 are more numerous than a piezoelectric buzzer. The buzzer is capable of only producing a single sound that is inherent in the construction of the buzzer, which is at a set frequency. Since the audible feedback of this disclosure is through the speaker 334 of the handheld electronic device 300, it is capable of producing a range of different sounds based on the construction of the particular speaker 334. It is even contemplated that themes or families of sounds may be user-designated, thereby customizing the sounds of the device 300.

Preferably, speaker 334, through its driver, is capable of producing sound from several different types of audio files. Some examples of the types of audio files that can be used to produce the sounds include, but are not limited to MP3, AAC+, WAV, MIDI, WMA, AU, and AIFF formats. This listing provides but a few of the available known audio file types, and those skilled in the art will likely appreciate others as well. The audio files can either be preloaded on the handheld electronic device 300 or downloaded over a communication link if the device is so equipped. These audio files can vary in complexity as well. The audio file need not be stored at the time of use by the handheld electronic device 300. In an exemplary embodiment, the handheld electronic device 300 produces sounds from instruction files provided from an audio service and which have been downloaded to the device over an incorporating wireless communication network 319 or a physical port.

Figure 2:
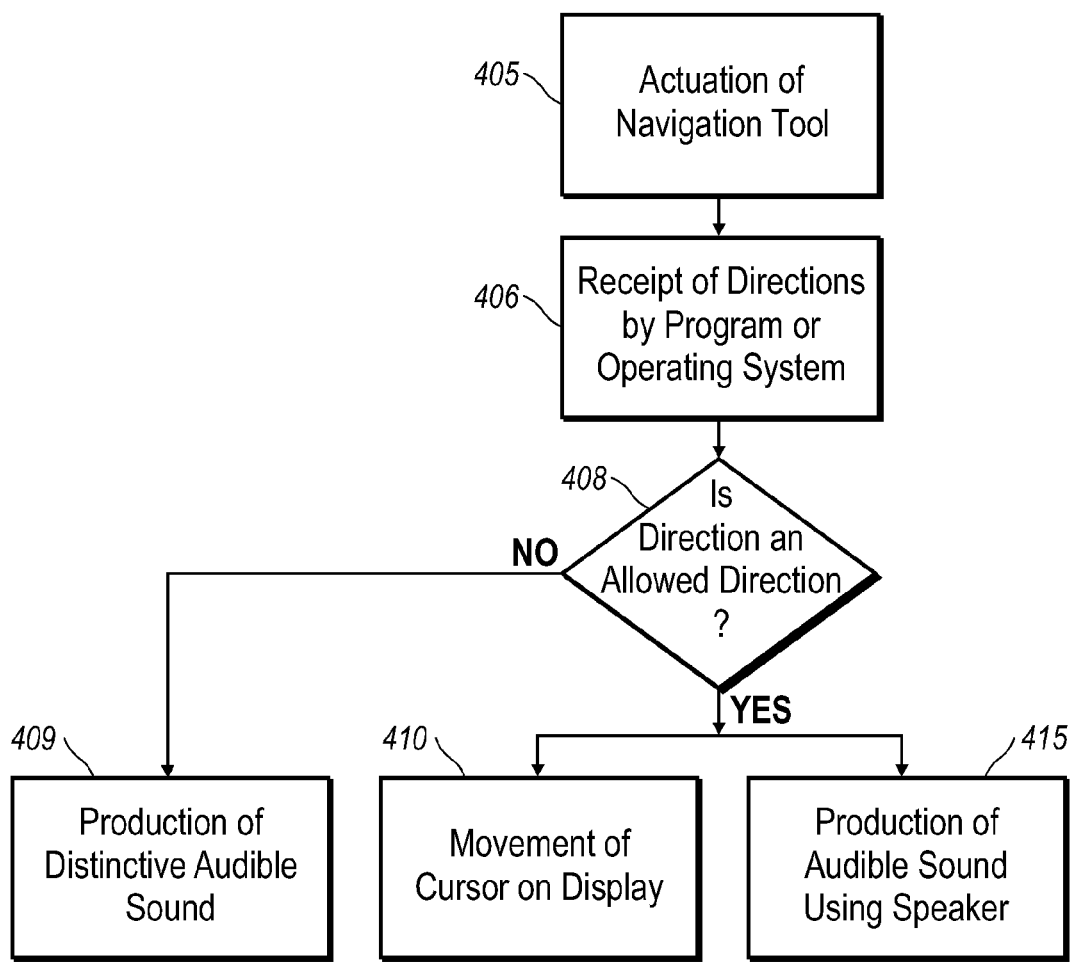
FIG. 2 is a flow chart illustrating an exemplary method for producing a distinctive sound when actuation of the navigation tool requests the cursor move in a non-allowed direction.

A preferred method for producing 415 audible sound that reflects user manipulation of the navigational tool 328 in a permissible direction (based on whether the driven cursor is allowed to move in the indicated direction) through the speaker 334 is illustrated in FIG. 2. When there is actuation 405 of the navigation tool 328, the actuation directions are then received 406 by a program or operating system of the device 300. Then a determination 408 is made whether the direction requested by the navigation tool will move the cursor on the display screen in an allowed direction. If the motion requested 405 is in an allowed direction, the cursor moves 410 in the indicated direction as requested by the navigation tool 328 and the speaker produces 415 an audible sound. However, if the motion requested by the navigation tool is in a direction that is not allowed by the currently open program or operating system, a distinctive audible sound is produced 409. An example of an unacceptable motion which would result in the production 409 of a corresponding negative sound is attempting to guide the cursor off the display screen. Another example would be indicating advancement of a highlighting cursor beyond the choices in a menu selection group.

In another exemplary embodiment, the user is able to select a desired sound to be produced over the speaker 334. In one particular embodiment, a sound theme may be set which selects a group of sounds that will issue forth from the device 300 when appropriate. The audible sound is adjustable in one of a desired pitch and volume level or both.

In another aspect, it is advantageous for the operating system of the handheld electronic device 300 to be capable of directing what sound should be produced over the speaker 334. Among others, this provides the ability to produce 409 different (distinctive) sounds based upon the location of the cursor on the screen of the device. Again, some examples of points at which different sounds might be produced include when the cursor encounters an edge of the display screen 322 and when it reaches the end of a menu listing. Still further, when the navigation tool 328 is actuated so as to cause the cursor to accelerate, a different sound can be made. Likewise as described above the sound produced over the speaker is capable of being controlled to effect one of a desired pitch and volume to be played by the speaker or both may be adjusted as well.

The control of the sound is also capable of being directed by the individual applications running on the handheld electronic device. Thus different types of sounds are capable of being produced depending upon what application is running. These different sounds as described above can be further modified by user settings or operating system settings. As an example, the sound produced while navigating in a menu is set to generate a distinctive set of sounds. Likewise, other applications such as email, games, and calendar to name a few each can be programmed to produce a distinctive set of sounds associated with the application.

In a preferred embodiment, the navigation tool 328 takes the form of a trackball 121 that is capable of accelerating operation, and as a result an audible sound is produced in correlation of the navigation tool 328 and cursor movement. In another embodiment, the physical input of the navigation tool 328 is not capable of accelerating movement, but the software controlling the motion of the cursor on the display is programmed to interpret certain activity of the tool 328 to produce accelerated cursor movement. These provide examples of when the sounds produced emulate the requested cursor acceleration. While changes in cursor acceleration have been described, it should be appreciated that the changing sounds can be used to indicate other cursor motion changes based upon the actuation of the navigation tool. While these are provided as examples, those skilled in the art will appreciate other situations in which it is desirable to change (abruptly or successively) the sound produced by the speaker 334.

The following provides an extended example of the above described production of distinctive audible sounds. When a trackball 121 is implemented as the navigation tool 328, it rotates freely and provides little if any tactile feedback. Thus, as the ball 121 of the tool 328 is rotated, clicking (or comparable) sound is produced 415 by the speaker 334. Each click sound in the preferred embodiment corresponds to a preselected increment of rotational motion of the ball 121 and similarly correlates to a preselected increment of motion by the cursor upon the screen 322. The clicking sound continues until the cursor reaches a boundary on the display screen 322 such as the end of a list of menu options. At that point, the audible sound may cease or something like a "thunk" or other distinctive sound may be produced 409, and which is different than the sound indicative of trackball rotation. As previously mentioned, it is a sound to indicate to the user that further motion of the cursor is prevented. If the user then moves the cursor over a menu item and selects it such as selecting "Reply" in an email program, the produced sound is a different sound that indicates a menu selection has been made, for example, through depression of the trackball 121. This sound could be something similar to "clink." Other types of navigation selections may provide for similarly distinctive sounds.

When scrolling fast through the text of an email, the clicking sound increases to match the speed of the scrolling. This provides a sense of speed at which the trackball 121 is being actuated (rolled) 409. While the above provides an example, other sounds and arrangements are considered within the scope of this disclosure.

Further aspects of the environments, devices and methods of employment described hereinabove are expanded upon in the following details. An exemplary embodiment of the handheld electronic device 300 as shown in FIG. 3 is cradleable in the palm of a user's hand. The size of the device 300 is such that a user is capable of operating the device 300 using the same hand that is holding the device 300. In a preferred embodiment, the user is capable of actuating all features of the device 300 using the thumb of the cradling hand. While in other embodiments, features may require the use of more than just the thumb of the cradling hand. The preferred embodiment of the handheld device 300 features a keyboard 332 on the face of the device 300, which is actuable by the thumb of the hand cradling the device 300. The user may also hold the device 300 in such a manner to enable two thumb typing on the device 300. Furthermore, the user may use fingers rather than thumbs to actuate the keys on the device 300. In order to accommodate palm-cradling of the device 300 by the average person, it is longer (height as shown in FIG. 3) than it is wide, and the width is preferably between approximately fifty and seventy-six millimeters (two and three inches), but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical key on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen 322, a current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Such display screens 322 may include one or more touch interfaces, including a touch-screen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command or function is obtained by depressing the physical key corresponding to the character, command or function displayed at a corresponding position on the display screen 322, rather than touching the display screen 322. To aid the user, indicia for the characters, commands and/or functions most frequently used are preferably positioned on the physical keys and/or on the area around or between the physical keys. In this manner, the user can more readily associate the correct physical key with the character, command or function displayed on the display screen 322.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

The QWERTY keyboard layout is the standard English-language alphabetic key arrangement 44 (see FIG. 5). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878, U.S. Pat. No. 207,559.

The QWERTZ keyboard layout is normally used in German-speaking regions. This alphabetic key arrangement 44 is shown in FIG. 6. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

The AZERTY keyboard layout is normally used in French-speaking regions. This alphabetic key arrangement 44 is shown in FIG. 7. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 8, 9, 10, 11:
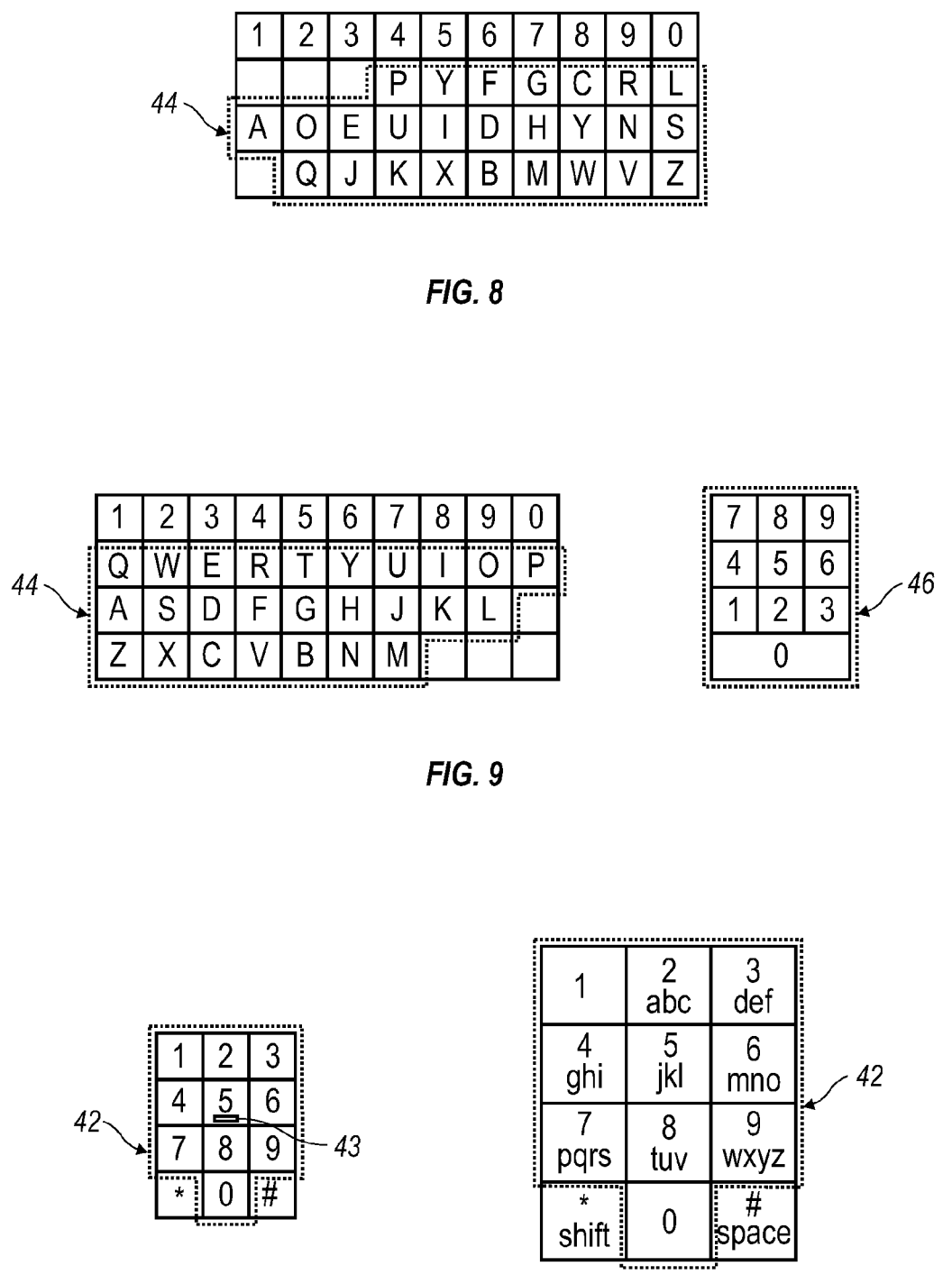

The Dvorak keyboard layout was designed in the 1930s by August Dvorak and William Dealey. This alphabetic key arrangement 44 is shown in FIG. 8. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 5-8 where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 9, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a known "ten-key" computer keyboard keypad. Additionally, a numeric phone key arrangement 42 is also known, as shown in FIG. 10.

As shown in FIG. 10, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

Handheld electronic devices 300 that include a combined text-entry keyboard and a telephony keyboard are also known. Examples of such mobile communication devices 300 include mobile stations, cellular telephones, wireless personal digital assistants (PDAs), two-way paging devices, and others. Various keyboards are used with such devices 300 depending in part on the physical size of the handheld electronic device 300. Some of these are termed full keyboard, reduced keyboard, and phone key pads.

In embodiments of a handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

One known device that uses a full keyboard for alphabetic characters and incorporates a combined numeric keyboard is shown in FIG. 12. In this device, numeric characters share keys with alphabetic characters on the top row of the QWERTY keyboard. Another device that incorporates a combined alphabetic/numeric keyboard is shown in FIG. 13. This device utilizes numeric characters in a numeric phone key arrangement consistent with the ITU Standard E.161, as shown in FIG. 10. The numeric characters share keys with alphabetic characters on the left side of the keyboard.

In order to further reduce the size of a handheld electronic device without making the physical keys or software keys too small, some handheld electronic devices use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types handheld electronic device to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage.

The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 14:
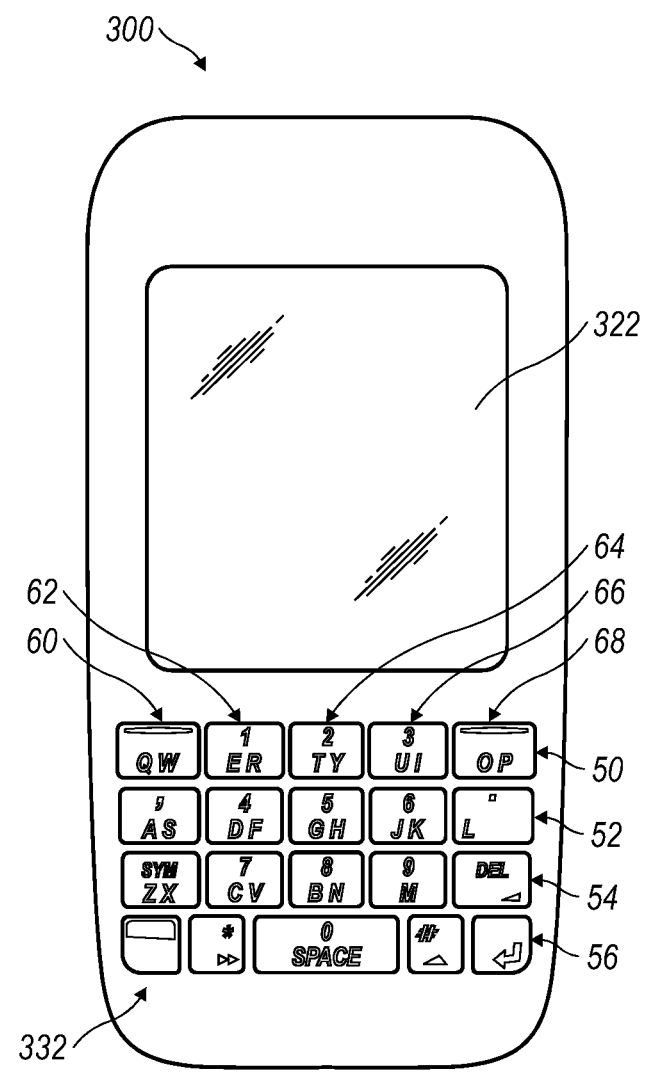
FIG. 14 is a front view of an exemplary handheld electronic device including a reduced QWERTY keyboard.

FIG. 14 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 14. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 300.

Figure 15:
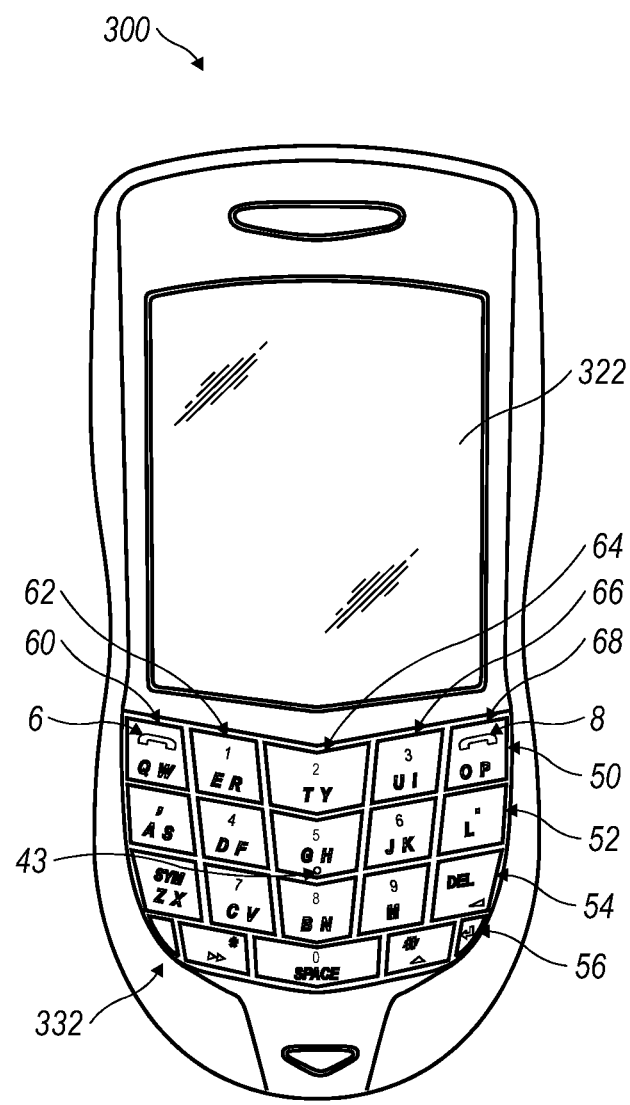
FIG. 15 is an elevational view of the front face of another exemplary handheld electronic device including a reduced QWERTY keyboard.
Figure 16:
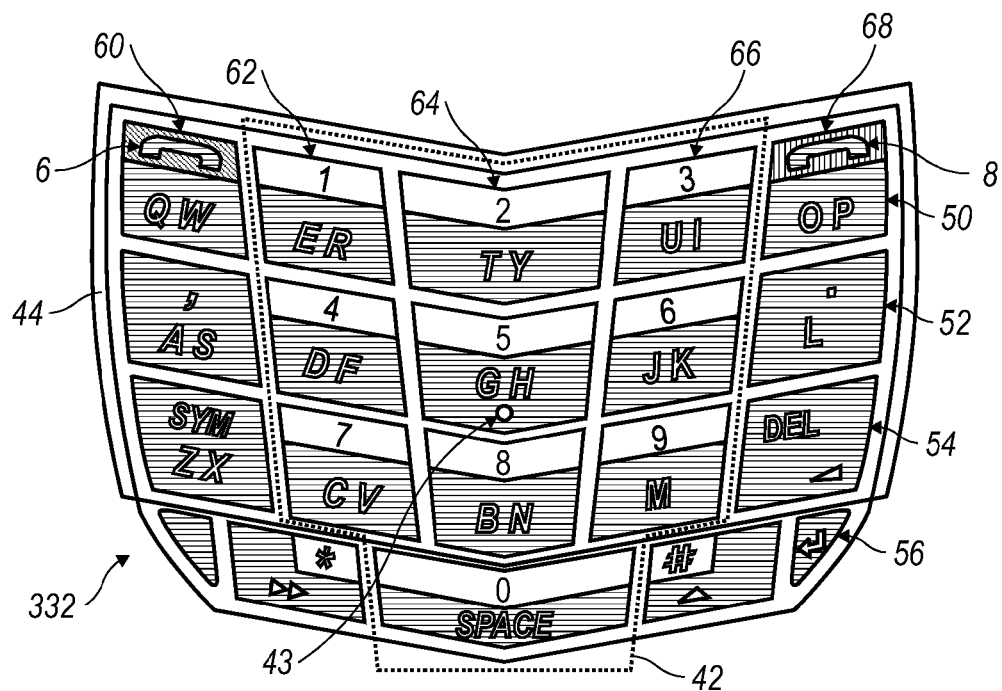
FIG. 16 is a detail view of the reduced QWERTY keyboard of device of FIG. 15.

FIG. 15 shows a handheld electronic device 300 that has an example physical keyboard array of 20 keys, with five columns and four rows. An exploded view of the keyboard is presented in FIG. 16. Fourteen keys on the keyboard 14 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 14 includes a "send" key 6 and an "end" key 8. The "send" key 6 is positioned in the upper left corner of the keyboard 14 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 17:
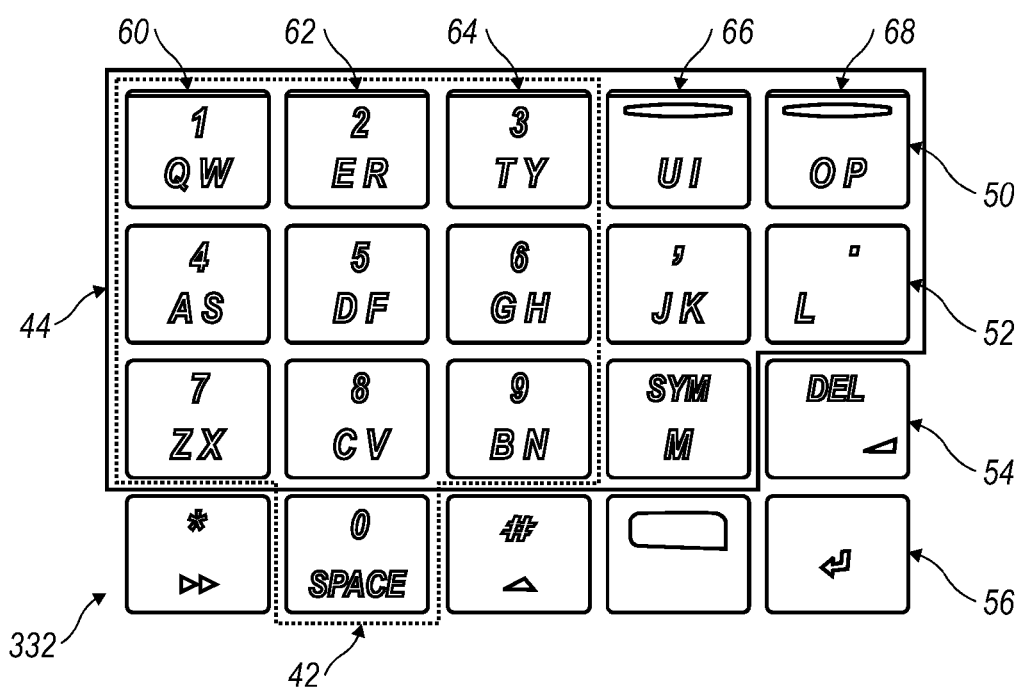
FIG. 17 is a detail view of an alternative reduced QWERTY keyboard.

FIG. 17 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 14. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 11. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| Number on Key | ITU E.161 | Australia | #1 | Mobile Phone Keypad #11 (Europe) | #111 (Europe) |
|---|---|---|---|---|---|
| 1 | | QZ | | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ÚVW | VWX |
| 9 | WXYZ | WXY | WXY | XYZ | YZ |
| 0 | | | OQZ | | |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

An exemplary handheld electronic device is shown in the assembly drawing of FIG. 3 and its cooperation in a wireless network is exemplified in the block diagram of FIG. 18. These figures are exemplary only, and those persons skilled in the art will appreciate the additional elements and modifications necessary to make the device work in particular network environments.

FIG. 4 is an exploded view showing some of the typical components found in the assembly of the handheld electronic device. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 3, the navigation tool 328 is a ball 121 based device. Other navigation tools 328 such as joysticks, four-way cursors, or touch pads are also considered to be within the scope of this disclosure. When the navigation tool 328 has a ball 121, the ball 121 itself can be removed without removal of the navigation tool 328. The removal of the ball 121 is enabled through the use of an outer removable ring 123 and an inner removable ring 122. These rings 122, 123 ensure that the navigation tool 328 and the ball 121 are properly held in place against the support frame 101.

A serial port (preferably a Universal Serial Bus port) 330 and an earphone jack 140 are fixably attached to the PCB 102 and further held in place by right side element 105. Buttons 130-133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 106, 105 provide additional protection and strength to the support structure of the device 300. In a preferred embodiment, backplate 104 is removably attached to the other elements of the device.

The block diagram of FIG. 18 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool 328. As previously mentioned, the navigation tool 328 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld electronic device 300b are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and data 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding both wireless handheld electronic devices, as well as the communication networks within which they cooperate. It should be appreciated, however, that a focus of the present disclosure is the enablement of varying sensitivity of the motion of the cursor on the display screen of a handheld electronic device.

The invention claimed is:

1. A method for producing an audible sound that emanates from a speaker of a handheld electronic device the method comprising:
    detecting at least one preselected incremental rotation of a navigation tool of a handheld electronic device, the at least one preselected incremental rotation requesting a specific motion of the cursor on a display screen of the handheld electronic device;
    determining, in response to the detecting, that the specific motion requested by the at least one preselected incremental rotation moves the cursor in a prohibited direction; and
    generating, in response to the determining, a first sound from the speaker of the handheld electronic device indicating that the specific motion requested by the at least one preselected incremental rotation moves the cursor in a prohibited direction,
    the first sound being separate and distinct from at least a second sound that indicates movement of the cursor in an allowed direction.

2. The method as recited in claim 1, where the speaker produces a plurality of different sounds in response to a plurality of supplied signals.

3. The method of claim 2, further comprising controlling one of a desired pitch and volume of at least one sound in the plurality of different sounds.

4. The method as recited in claim 1, where the handheld electronic device transmits data to, and receives data from a communication network utilizing radio frequency signals, the data transmitted between the handheld electronic device and the communication network supporting voice and textual messaging.

5. The method as recited in claim 1, where the handheld electronic device comprises a keyboard having alphabetic letter that are configured in one of a QWERTY, QWERTZ, AZERTY, and Dvorak layout.

6. The method of claim 2, where at least one sound in the plurality of difference sounds is adjusted based upon a speed of the cursor on the display screen of the handheld electronic device.

7. The method of claim 1, where the first sound depends upon a theme set by a user of the handheld electronic device.

8. An audible feedback system for a handheld electronic device comprising:
    a speaker physically connected to a handheld electronic device;
    a navigation tool for controlling motion of a cursor about a display screen of the handheld electronic device; and
    a controller configured to control signals to be sent to the speaker, the controller being further configured to:
        detect at least one preselected incremental rotation of the navigation tool, the at least one preselected incremental rotation requesting a specific motion of the cursor on the display screen;
        determine, in response to the detection, that the specific motion requested by the at least one preselected incremental rotation moves the cursor in a prohibited direction;
        generate, in response to the determination, a first sound from the speaker indicating that the specific motion requested by the at least one preselected incremental rotation moves the cursor in a prohibited direction,
        the first sound being separate and distinct from at least a second sound that indicates movement of the cursor in an allowed direction; and
        disallowing the specific motion of the cursor on the display screen in response to determining that the specific motion requested by the at least one preselected incremental rotation moves the cursor in a prohibited direction.

9. The audible feedback system as recited in claim 8, where the speaker produces a plurality of different sounds in response to a plurality of supplied signals.

10. The audible feedback system of claim 9, the controller being further configured to control one of a desired pitch and volume of at least one sound in the plurality of different sounds.

11. The audible feedback system as recited in claim 8, where the handheld electronic device transmits data to, and receives data from a communication network utilizing radio frequency signals, the data transmitted between the handheld electronic device and the communication network supporting voice and textual messaging.

12. The audible feedback system as recited in claim 8, further comprising a keyboard having alphabetic letters that are configured in one of a QWERTY, QWERTZ, AZERTY, and Dvorak layout.

13. The audible feedback system of claim 9, where at least one sound in the plurality of different sounds is adjusted based upon a speed of the cursor on the display screen of the handheld electronic device.

14. The audible feedback system of claim 8, where the first sound depends upon a theme set by a user of the handheld electronic device.

\* \* \* \* \*